June 7, 1955
A. L. MOTTET ET AL
2,710,276
VENEERED CONSOLIDATED PRODUCTS
AND METHOD OF MAKING THE SAME
Filed March 13, 1951
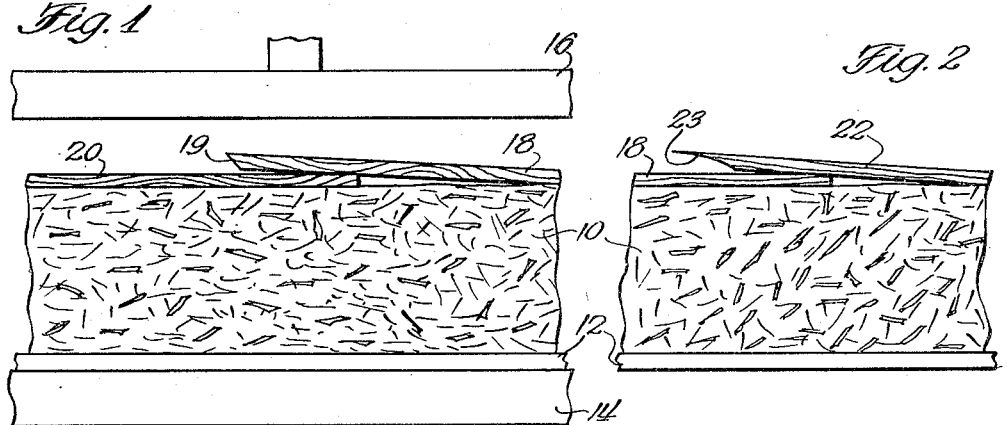
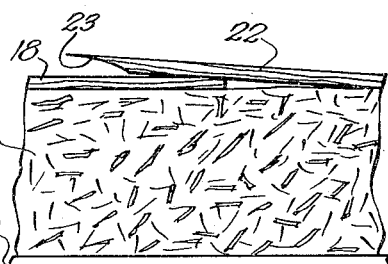
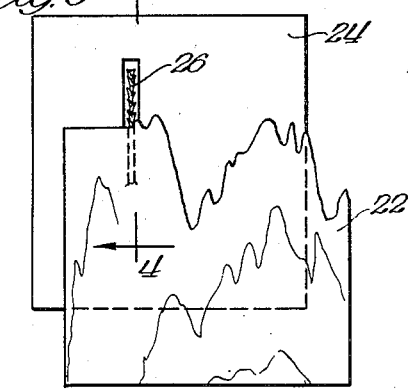
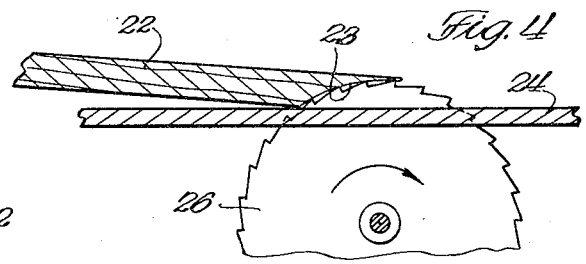
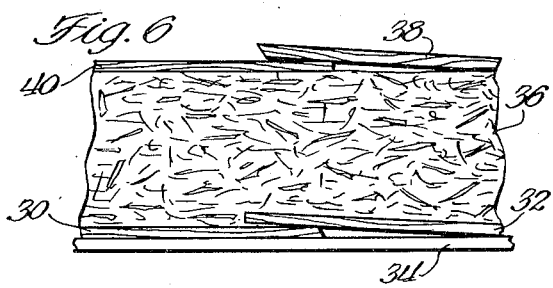
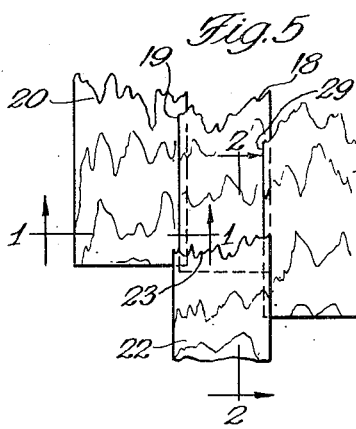
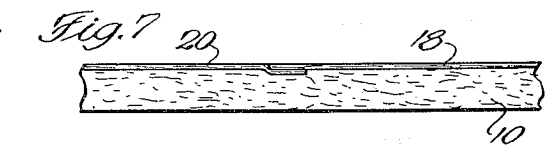
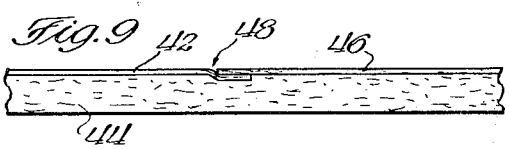
Inventors:
Arthur L. Mottet
Thomas E. Heppenstall
Wayne R. Kletsch
By Eugene D. Farley
atty.

United States Patent Office
2,710,276
Patented June 7, 1955

2,710,276

VENEERED CONSOLIDATED PRODUCTS AND
METHOD OF MAKING THE SAME

Arthur L. Mottet, Thomas E. Heppenstall, and Wayne
R. Kletsch, Longview, Wash., assignors to The Long-
Bell Lumber Company, Longview, Wash., a corpora-
tion of Missouri Application March 13, 1951, Serial No. 215,311

14 Claims. (Cl. 154—118)

The present invention relates to veneered consolidated products such as hardboard, and to the method of making the same.

Hardboard is made by forming a thick felt or mat of wood, or other material, in the form of fibers, flakes or shavings, and thereafter consolidating the felt by the application of heat and pressure with or without the addition of extraneous binder. There is produced in this manner a hard sheet material having a density in the range of 0.7 to 1.2. Although this product is useful per se in many applications, its usefulness may be enhanced in applications such as the fabrication of furniture and cabinets by covering it with wood veneer or other decorative sheet material.

The production of veneered hardboard is difficult however, for several reasons. In the first place, it is difficult to bond the veneers firmly to the hardboard core. Secondly, the hardboard sheets are conventionally of substantial size, as 4' x 8' or even larger. Since it is difficult to procure veneer sheets of corresponding size, facing sheets must be pieced together from a number of small pieces. Merely placing such pieces in edge to edge relationship to each other and gluing them to the hardboard base is unsatisfactory because the strips tend to pull apart from each other upon shrinking and swelling of the base with humidity changes. It therefore is necessary to unite the edges of the veneered strips. Conventional edge gluing techniques may be used for this purpose, but these involve a separate operation requiring special and expensive machinery.

Another problem involved in surfacing hardboard with wood veneers is the difficulty of forming an imperceptible joint between adjacent pieces of veneer. The joint may be conspicuous because of edge separation of the veneers as explained above. It may also be conspicuous even where the veneers are edge bonded to each other because of dissimilarity of grain pattern or wood color between the adjacent veneer pieces.

Furthermore, the joint may be conspicuous because of irregularity in surface contour of the veneered hardboard product, the edges of some of the pieces projecting upwardly beyond the plane of the veneered sheet, or separated from the adjacent veneered piece by a noticeable depression. It therefore is a primary object of the present invention to provide a method of making veneered hardboard which results in the formation of a product wherein the veneers are firmly bonded to the hardboard core and are edge-united to each other through inconspicuous joints.

It is another object of this invention to provide a method of making veneered hardboard utilizing scrap veneer pieces of relatively small dimensions as compared with the dimensions of the hardboard core.

Still a further object of the present invention is the provision of a method of making veneered hardboard which successfully unites small pieces of veneer in edge to edge relationship to each other through substantially imperceptible joints to form uniform facing sheets decoratively covering the hardboard core.

Still another object of this invention is the provision of a method of making veneered hardboard wherein the veneered product is made in a single consolidating operation from a fibrous mat and pieces of veneer.

Still another object of the present invention is the provision of a method of uniting wood veneers in end to end relationship to each other on a fibrous base through joints wherein the wood grain patterns merge with each other to form a continuous and uniform surface pattern.

Still another object of the present invention is the provision of a method of making veneered hardboard which is simple and economical to effectuate and which is adaptable for use with a variety of raw materials.

Still a further object of the present invention is the provision of a veneered hardboard product comprising pieces of wood veneer secured to a hardboard base, the joints between the pieces of wood veneer being substantially imperceptible both visually and tactually.

The manner in which the foregoing and other objects of this invention are accomplished will be apparent from the accompanying specification and claims, considered together with the drawings, wherein:

Figure 1 is a schematic, fragmentary, end view in elevation taken in the plane indicated by lines 1—1 of Figure 5, of a felt-veneer assembly laid up by the method of the present invention, illustrating the method of joining the side edges of the surface veneers, i. e. the edges running in a direction parallel to the grain of the wood;

Figure 2 is a schematic, fragmentary, side view in elevation taken in the plane indicated by lines 2—2 of Figure 5, of the felt-veneer assembly of the invention, illustrating the manner of joining the end edges of the veneers, i. e. the edges running in a direction across the wood grain;

Figure 3 is a schematic plan view of a rotary saw illustrating its application to the preparation of the end edges of pieces of veneer to be used in the method of the present invention;

Figure 4 is a sectional view taken along the lines 4—4 of Figure 3;

Figure 5 is a fragmentary plan view of the veneered hardboard of the present invention illustrating the appearance of the joints uniting the pieces of veneer comprising the facing sheets of the assembly;

Figure 6 is a fragmentary view in elevation similar to Figure 1, illustrating the invention in another of its embodiments;

Figure 7 is an end view in elevation of the felt-veneer assembly of Figure 1 after consolidation;

Figure 8 is a side view in elevation of the felt-veneer assembly of Figure 2 after consolidation; and Figure 9 is a view similar to Figure 7 illustrating another aspect of the invention.

Generally stated, the presently described method of making veneered hardboard comprises forming a compressible felt of a suitable material and covering it with pieces of veneer. The edges of the veneer pieces are bevelled, the outline of the end edges, i. e. those lying across the grain of the wood, preferably being irregular. The veneers are placed on the felt with their edges overlapping and with the bevelled edges outermost and facing the felt.

Adhesive is applied to the boundary surface between the felt and the undersides of the veneers. This may be accomplished either by distributing solid or liquid adhesive throughout the felt during its formation, by coating the undersides of the veneer pieces with adhesive, by impregnating the veneer pieces with adhesive, or otherwise.

The entire assembly comprising the felt with over-laid veneer pieces having overlapped edges then is placed in a suitable press and compressed. This consolidates the felt, and binds the veneers thereto while contemporaneously edge-uniting the latter through joints which are imperceptible both visually and tactually.

Considering the foregoing process in greater detail and with particular reference to the drawings:

In executing the presently described method a felt or mast 10 first is built up using any suitable dry felting technique, or a wet felting procedure followed by drying of the wet lap to a suitable moisture content, e. g. a moisture content of below about 25% by weight, preferably below about 12% by weight. The fibrous material employed may comprise a diversity of animal, vegetable or mineral substances, but preferably comprises lignocellulose material such as wood. The wood may be in the form of shavings or flakes of relatively large particle size and preferably is in the form of fiber such as is customarily used in the manufacture of hardboard.

Although a suitable thermoplastic adhesive may be employed in consolidating the felt, the thermosetting adhesives are particularly well suited for this purpose. Thus thermosetting adhesives such as the phenol aldehyde resins or the urea aldehyde resins may be mixed with the fiber in suitable amount, e. g. about 3% by weight, before the latter is laid up into a felt. Alternatively, the felt may be sprayed or otherwise impregnated with a liquid binding material after it has been formed.

The adhesive-containing felt may be formed upon or transferred to the caul plate 12 of an hydraulic press, the lower platen of which is represented at 14 and the upper platen at 16. The press may be one of conventional construction wherein the platens 14, 16 are provided with heating means to dry out the felt and set the adhesive contained therein.

Next the veneer facing sheets are prepared for application to the felt. These may comprise any suitable wood species, either hard or soft. Also, they may be of any suitable size, the presently described method being particularly designed for using rectangular pieces of scrap veneer of random dimensions. Preferably, however, the pieces should have similar color and grain pattern. The thickness of the veneers likewise is variable, veneers having a thickness ranging between $1/10$ inch and $1/100$ inch being suitable, and those having a thickness of about $1/28$ inch being preferred.

Where the veneers are very thin, e. g. $1/50$ to $1/100$ inch, no preliminary edge treatment is needed. However, in the usual case where the veneers are from $1/10$ to $1/50$ inch thick at least one of the side edges and at least one of the end edges of each of the veneer pieces are bevelled or inclined. Somewhat differing bevelling procedures preferably are followed in these two bevelling operations. In bevelling the side edges, the line of the edge may be left substantially straight, being undercut to form a bevel having an inclination of from about 30° to about 60° from the vertical, i. e. with respect to the plane of the overlapping veneer surface.

In bevelling the end edges of the veneers a greater degree of inclination of the overlapping veneer is desirable, a feathered edge being preferred. In addition, to make the joint particularly imperceptible, the end edge is cut in irregular outline. In this manner the line of the joint is made to blend with the grain of the wood where the veneer material is of the slash grain type cut on a veneer lathe.

A convenient and effective method of bevelling the end edges of the veneers and of contemporaneously forming them in an irregular outline is illustrated in Figures 3 and 4. As is apparent from these figures, a strip of wood veneer 22 may be traversed with respect to a rotary saw indicated generally at 24, the blade 26 of the saw being substantially aligned with the grain of the veneer. As the veneer is traversed from left to right, as viewed in Figure 3, it is given a reciprocating motion in the grain direction with the result that an irregular cut is made across the grain of the veneer piece, i. e. in a cross-grain direction. At the same time, because of the arcuate configuration of the rotary saw, a desired degree of bevel is given to the cut end edge (Figure 4).

If the amount of adhesive contained in the felt is not sufficient to bond the veneers thereto through squeeze-out or penetration occurring during pressing, a suitable adhesive may be applied to the under faces of the veneers prior to assembly by spraying or brushing it on if it is in liquid form, or by applying it directly in granular form. The latter is preferable for the reason that the liquid phenol aldehyde resins desirably employed as adhesives customarily contain about 60% water. This is converted to steam during the pressing operation with a resulting tendency toward blistering and delaminating of the panels.

The adhesive-coated veneer pieces having their end edges bevelled and cut irregularly and their side edges bevelled as described above then are assembled on the felt in the manner illustrated in Figures 1, 2 and 5. Thus the bevelled side edge 19 of the veneer 18 may be placed so that it overlaps the side edge of the adjacent piece of veneer 20 which need not be bevelled. The distance of overlapping may be varied, but in order to unite the overlapped pieces securely, the overlapping preferably should be about ½ inch.

Also, the piece of veneer 22 having a bevelled end edge 23 is placed in overlapping position with respect to the end edge of the adjacent veneer piece 18, the degree of overlapping again preferably being about ½ inch. The inclined edges of veneer pieces 18 and 22 are faced in the direction of the underlapping veneers and of the resin impregnated felt 10 lying on the caul plate 12.

As a result of the foregoing procedure, there is built up on the surface of the felt a covering layer of overlapping pieces of veneer arranged in the manner illustrated in Figure 5. It will be noted that the pieces are arranged with the bevelled side edge 19 of piece 18 overlapping the adjacent unbevelled side edge of piece 20. Also, the piece 28 having a bevelled side edge 29 is placed so that the latter overlaps the adjacent unbevelled side edge of piece 18. Still further, the piece 22 having a bevelled end edge 23 is positioned so that it overlaps the edge of piece 18 and partially overlaps the end edge of piece 20.

If it is desired to prepare a product having veneer facings on both sides, a layer of veneer pieces having bevelled edges overlapping the adjacent pieces of veneer may be built up in the manner illustrated in Figure 6. In this embodiment, pieces of veneer may be placed directly on caul plate 34. Some of the veneer pieces, such as veneer piece 30 are provided with bevelled edges. Others, such as veneer piece 32, are placed so that they overlap the veneer pieces of the class of piece 30 with the bevelled edges of the latter facing upwardly, i. e. facing the overlapping veneer 32. A compressible felt 34 then may be superimposed on the overlapped veneer pieces. Next a top surface layer of veneer pieces may be placed over the felt, some of the pieces such as piece 38 having bevelled edges which are placed in overlapping relationship to the edges of other pieces, such as piece 40, the bevelled edges of the overlapping piece 38 facing the underlapped pieces 40.

Next the entire assembly is consolidated in the press by the application of heat and pressure calculated to form a compressed product of the desired density and to set the adhesive. Such temperatures and pressures may lie within the broad range, for example, of from about 200° to about 500° F., and from about 200 to about 700 pounds per square inch. The adhesive then binds together the individual fibers comprising the felt, bonds the veneers to the felt surface, and unites the overlapping edges of the veneer pieces to form a substantially continuous sheet. The overall reduction in thickness of the assembly may be, for example, from an original thickness of about 10 inches to a final thickness of about ⅜ inch.

The final product comprises a consolidated board having the appearance illustrated in Figures 5, 7 and 8, when a veneer surface is applied to one of its faces only. Because of the bevelling of the overlapping veneers, the joints between the side edges of adjacent veneer pieces are substantially imperceptible both visually and tactually. The overlapping veneers do not project above the plane of the adjacent veneers, nor is there a boundary depression between the two pieces, even when veneers of substantial thickness are employed. Also, the line of demarcation between the side edges of the veneer pieces runs in a direction parallel to the grain and is indistinguishable therefrom except upon very close inspection.

Similarly the joints between the end edges of the adjacent pieces of veneer is substantially imperceptible. Because of the bevelling of the superimposed end edges, there is no depression or elevation of the joints. Because of the irregular configuration of these edges the joints assume a wavy appearance which blends effectively with the wood grain. This desirable effect is obtained, moreover, by use of a method wherein the veneers are attached to the core through a single pressing operation, i. e. that used to consolidate the felt. In addition, the method is rapid and makes possible the use of odd pieces of veneer having random dimensions, which otherwise might be discarded as scrap.

It is to be noted particularly that the invisible joint obtained between adjacent pieces of veneer by the practice of the presently described method is quite different in construction from that obtained by overlapping two pieces of material having matching or complementary bevels on their adjacent edges, the overlapping including the bevelled portions only of the pieces. In such a case the added increment of thickness caused by the overlapping is compensated for by the use of the matching bevels.

In the present method, however, the edge of the overlapped piece only need be bevelled. Then when the assembly including the compressible core and the overlapping veneers is subjected to substantial pressure, the outer surfaces of the overlapped veneers are levelled by the smooth press members with which they are in contact. This is possible in spite of the overlapping because the underlapped veneer is pressed into the compressible core. In spite of this, however, and because of the fibrous nature of wood, the surface still would not be uniformly smooth if it were not for the fact that the edge of the overlapped veneer is bevelled.

As is particularly apparent from Figure 9, the pressing of the underlapping veneer 42 into the compressible core 44 induces a bend in the former. Under the conditions existing in the press this bend is not at right angles. On the contrary, the fibrous structure of the veneer causes it to assume an arcuate form. As a result, the adjacent edge of the overlapping veneer 46, which is clipped at substantially a right angle, does not form a continuous joint with the underlapping veneer 42. Rather, there is left a space indicated at 48 which runs the length of the joint and renders it relatively conspicuous. Where, however, the edge of the overlapping veneer is bevelled, as is indicated in Figures 1 and 2, the bevelled portion fills in this void so that a continuous outer surface is produced.

It is to be understood that the forms of our invention herein shown and described are to be taken as preferred examples of the same, and that various changes in the shape, size and arrangement of the parts may be resorted to, without departing from the spirit of our invention or the scope of the subjoined claims.

Having thus described our invention, we claim:

1. The method of making veneered consolidated products which comprises forming wood particles into a compressible mat, placing a first piece of wood veneer on a portion of the mat surface, placing a second piece of wood veneer on an adjacent portion of the said mat surface with the grain direction of the second piece being substantially aligned with the grain direction of the first piece, one of the cross grain edges of the second piece being bevelled and formed in an irregular outline conforming substantially to the grain pattern of the piece, the bevelled irregular edge of the second piece overlapping a margin of the first piece with the bevel facing inwardly, supplying an adhesive material to the particles comprising the mat and to the interface between the overlapped portions of the veneer pieces, and pressing the resulting assembly, thereby consolidating the mat, fastening the veneer pieces thereto, and joining together the overlapped portions of the veneer pieces through a substantially planar joint which blends with the grain pattern of the pieces.

2. The method of claim 1 including the step of pressing the assembly to substantially uniform thickness.

3. The method of claim 1 wherein the overlapped edge of the first veneer piece is substantially square cut.

4. The method of claim 1 including the step of insuring that the moisture content of the mat prior to pressing is less than 25% by weight.

5. The method of claim 1 wherein the veneer pieces have thicknesses of from ¹⁄₁₀ to ¹⁄₅₀ inch.

6. The method of claim 1 wherein the overlapping edge of the second veneer piece is bevelled at an angle of from 30° to 60° with respect to the plane of the overlapping veneer surface.

7. The method of claim 1 wherein the veneer pieces have thicknesses of from ¹⁄₁₀ to ¹⁄₅₀ inch and wherein the overlapping edge of the second veneer piece is bevelled at an angle of from 30° to 60° with respect to the plane of the overlapping veneer surface.

8. The veneered product comprising a consolidated core of wood particles glued to each other and at least two pieces of wood veneer having thicknesses of from ¹⁄₁₀ to ¹⁄₅₀ inch glued to a surface of the core, the adjacent margins of the pieces overlapping, the overlying edge of the overlying margin being beveled inwardly at an angle of from 30 to 60° with reference to the surface of the overlying veneer piece, the underlying margin being embedded in the core, and the overlying margin being glued to the underlying margin to form a continuous, substantially planar joint between the pieces.

9. The veneered product of claim 8 wherein the underlying edge of the underlying veneer margin is substantially square cut.

10. The veneered product of claim 8 wherein the veneer pieces are arranged with their grain directions substantially aligned and with their cross-grain margins overlapping, the bevelled edge of the overlying margin being formed in an irregular outline conforming substantially to the grain pattern of the veneer piece.

11. The veneered product comprising a consolidated core of wood particles glued to each other and at least two pieces of wood veneer glued to a surface of the core, the pieces of veneer being arranged with their grain directions substantially aligned and with their adjacent cross-grain margins overlapping, the edge of the overlying margin being inwardly bevelled and formed in an irregular outline conforming substantially to the grain pattern of the veneer piece, the underlying margin being embedded in the core, and the overlying margin being glued to the underlying margin to form a continuous, substantially planar joint which blends with the grain pattern of the pieces.

12. The method of making veneered consolidated products which comprises forming lignocellulose particles into a compressible mat, placing a first piece of wood veneer on a portion of the mat surface, placing a second piece of wood veneer on an adjacent portion of the said mat surface with the grain direction of the second piece being substantially aligned with the grain direction of the first piece, one of the cross grain edges of the second piece being bevelled and formed in an irregular outline conforming substantially to the grain pattern of the piece, the bevelled irregular edge of the second piece overlapping a margin of the first piece with the bevel facing inwardly, supplying an adhesive material to the particles comprising the mat and to the interface between the overlapped portions of the veneer pieces, and pressing the resulting assembly, thereby consolidating the mat, fastening the veneer pieces thereto, and joining together the overlappd portions of the veneer pieces through a substantially planar joint which blends with the grain pattern of the pieces.

13. The veneered product comprising a consolidated core of lignocellulose particles glued to each other and at least two pieces of wood veneer having thicknesses of from 1/10 to 1/50 inch glued to a surface of the core, the adjacent margins of the pieces overlapping, the overlying edge of the overlying margin being bevelled inwardly at an angle of from 30 to 60° with reference to the surface of the overlying veneer piece, the underlying margin being embedded in the core, and the overlying margin being glued to the underlying margin to form a continuous, substantially planar joint between the pieces.

14. The veneered product comprising a consolidated core of lignocellulose particles glued to each other and at least two pieces of wood veneer glued to a surface of the core, the pieces of veneer being arranged with their grain directions substantially aligned and with their adjacent cross-grain margins overlapping, the edge of the overlying margin being inwardly bevelled and formed in an irregular outline conforming substantially to the grain pattern of the veneer piece, the underlying margin being embedded in the core, and the overlying margin being glued to the underlying margin to form a continuous, substantially planar joint which blends with the grain pattern of the pieces.

References Cited in the file of this patent

UNITED STATES PATENTS

| | | |
|---|---|---|
| 1,875,056 | Loetscher | Aug. 30, 1932 |
| 1,911,374 | Loetscher | May 30, 1933 |
| 1,997,996 | Carstens | Apr. 16, 1935 |
| 2,263,536 | Dike | Nov. 18, 1941 |
| 2,389,944 | Winkel | Nov. 27, 1945 |
| 2,452,739 | Fairchild | Nov. 2, 1948 |